United States Patent [19]

Capelle

[11] Patent Number: 5,221,504
[45] Date of Patent: Jun. 22, 1993

[54] PROCESS AND APPARATUS FOR OPTIMAL OPERATION OF A HIGH-SPEED EXTRUDER

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 806,275

[22] Filed: Dec. 13, 1991

[30] Foreign Application Priority Data

Dec. 14, 1990 [DE] Fed. Rep. of Germany ....... 4039942
Nov. 19, 1991 [DE] Fed. Rep. of Germany ....... 4137969

[51] Int. Cl.$^5$ .............................................. B29C 47/64
[52] U.S. Cl. .............................. 264/211.23; 264/349;
366/80; 425/205; 425/208; 425/382.4
[58] Field of Search ............. 264/349, 211.21, 211.23;
425/205-209, 382.4; 366/79, 80

[56] References Cited

U.S. PATENT DOCUMENTS

| | | | |
|---|---|---|---|
| 4,136,969 | 1/1979 | Meyer | 425/208 |
| 4,178,104 | 12/1979 | Menges et al. | |
| 4,184,772 | 1/1980 | Meyer | 425/382.4 |
| 4,214,859 | 7/1980 | Anders | 425/382.4 |
| 4,695,165 | 9/1987 | Fukumizu et al. | 425/208 |
| 4,696,575 | 9/1987 | Upmeier | 425/208 |
| 4,779,989 | 10/1988 | Barr | 425/207 |
| 4,872,761 | 10/1989 | Geyer | 425/208 |
| 4,994,223 | 2/1991 | Hestehave et al. | 264/349 |
| 5,141,426 | 8/1992 | Capelle | 425/205 |

FOREIGN PATENT DOCUMENTS

| | | | |
|---|---|---|---|
| 1142839 | 6/1956 | Fed. Rep. of Germany. | |
| 57-207044 | 12/1982 | Japan | 425/205 |
| 1153678 | 5/1969 | United Kingdom | 366/79 |
| 2052361A | 1/1981 | United Kingdom | 425/205 |
| 2068249 | 1/1981 | United Kingdom. | |

*Primary Examiner*—Jeffery Thurlow
*Attorney, Agent, or Firm*—Foley & Lardner

[57] ABSTRACT

A process and an apparatus for optimal operation of a high-speed extruder in which a pin-lined barrel section and a Transfermix section, both known per se but separately used, are utilized together in an extruder. The combination of these mixing systems allows in a surprising way an increase in the material throughput of 60% to 100%, with the mixing quality remaining the same and the drive torque being halved. The static extrudate pressure can be further increased by arranging an adjustable restriction device downstream of the extruder screw, thereby permitting a further increase in the output rate.

10 Claims, 1 Drawing Sheet

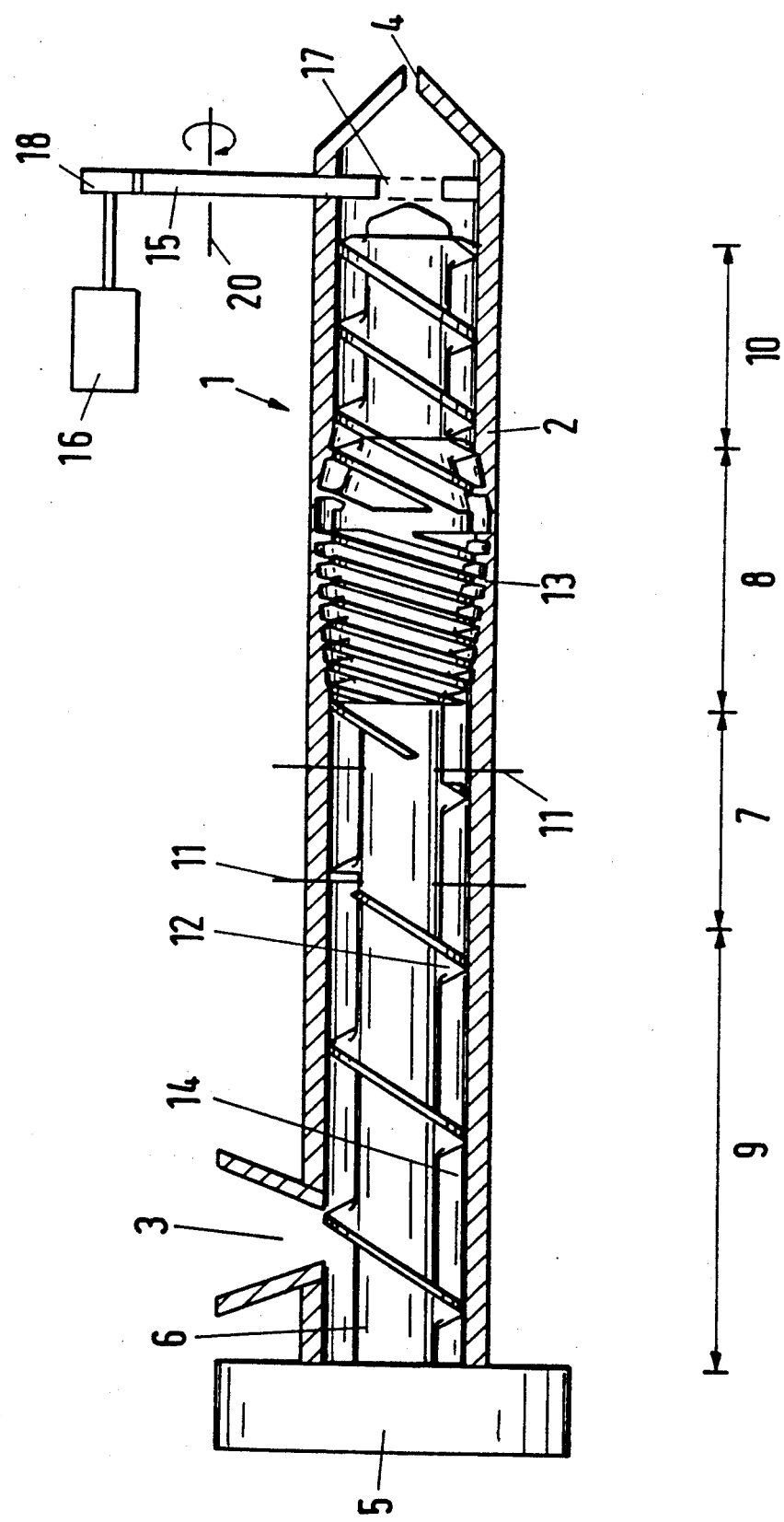

PROCESS AND APPARATUS FOR OPTIMAL OPERATION OF A HIGH-SPEED EXTRUDER

BACKGROUND OF THE INVENTION

The invention relates to a process and an apparatus for optimal operation of an extruder for the processing and production of rubber and thermoplastic materials. The invention constitutes an improvement over the extruder disclosed in Ser. No. 07/693,225, now U.S. Pat. No. 5,127,741, granted Jul. 7 1992 which is incorported herein by reference.

In the field of extruder technology, it has long been known to design an extruder in such a way that, in mixing sections, metal pins protrude through its barrel into the processing space for the extrudate. In such pin-lined barrel extruders, the flights of the extruder screw are interrupted at the points at which the pins protrude into the extruder barrel. Such extruders are known, for example, from German Offenlegungsschrift 2,235,784 or German Offenlegungsschrift 3,003,615.

These extruders are distinguished by a very good mixing and homogenizing effect on the material to be processed and, in addition, permit an increased material throughput per unit time through the extruder at the same screw speed. These advantages, and constant improvements, have resulted in pin-lined barrel extruders becoming the most frequently used mixing and homogenizing extruders in the last 15 years.

Independently of this, a mixing section for an extruder which has become known as the Transfermix mixing section has been developed and is disclosed in DE-A 1,142,839. This mixing section essentially comprises the feature that both the extruder screw and the inner wall of the extruder barrel are provided with grooves and flights over a certain length, the channel depth of the extruder screw decreasing to zero and subsequently increasing again in the longitudinal direction of the extruder barrel to the same degree as the channel depth of the barrel grooves respectively increases and decreases. Due to this design of extruder screw and barrel, when the mixing screw is rotating, extrudate is completely exchanged between the screw grooves and the barrel grooves, providing a good mixing effect on the extrudate.

The Transfermix extruder was able to claim a certain share of the market over the pin-lined barrel extruder, in particular whenever the overall length of the extruder was to be kept small. However, what is disadvantageous about this mixing section design is the comparatively high manufacturing outlay.

SUMMARY OF THE INVENTION

Since, apart from improvements in details, the technology of extruder mixing sections has not changed in the last 15 to 20 years, the present invention was based on the object of providing, on the basis of known apparatuses, a new generation of mixing and homogenizing extruders which permit an increased extrudate output with improved mixing and homogenizing performance with an extruder of reduced length.

By combining the two known mixing section technologies, it is surprisingly possible to create an extruder having considerable advantages over the mixing and homogenizing extruders of the prior art.

For instance, with a laboratory extruder having both a pin-lined barrel zone and a Transfermix zone, it has been found that, with the same mixing quality and the same screw speed, the drive power of the extruder could be reduced by 50% and the melt throughput increased by 60% to 100%.

These excellent results bring about, furthermore, a 50% reduction in the drive torque, which results in a great reduction in the gear transmission costs. In addition, by combining the pin-lined barrel mixing section and the Transfermix mixing section, the component length of the mixing zone necessary for the same mixing quality can be reduced by about 50% compared with an extruder which operates only on the pin-lined barrel principle.

The further development of this type of new extruder has now shown that the output rate of such an extruder can be further increased if there prevails in the zone of the Transfermix section a static extrudate pressure of 150–300 bar, which, depending on the particular extrudate, is preferably 200–250 bar.

In order to be able to set this static pressure independently of the opening cross section of the die of the extruder and the properties of the extrudate, it is envisaged according to the invention to provide an apparatus for producing and setting this static pressure at the downstream end of the extruder barrel but still ahead of the die.

BRIEF DESCRIPTION OF THE APPLICATION DRAWING

The invention can be explained with reference to an illustrative embodiment shown in the single figure of the application drawing which comprises a partially diagrammatic longitudinal sectional view of a screw extruder.

DETAILED DESCRIPTION OF THE PREFERRED EMBODIMENTS

Arranged inside the extruder barrel 2 of extruder 1 is an extruder screw 6, which is driven about its longitudinal axis by a drive unit 5. The barrel 2 has in the region of its upstream end a feed opening 3 for the material to be extruded, with the ready-mixed and homogenized extrudate being discharged through the outlet opening 4.

The extruder screw 6 has in the feed zone 9 a screw geometry which is suitable for drawing the material fed through the feed opening 3 into the extruder and plasticizing it in a way known per se.

Provided downstream of this feed zone 9 is a pin-lined barrel zone 7, in which two rows of pins shown schematically at 11 protrude radially through the extruder barrel 2, in the direction of the screw axis, into the processing space 14 of the extruder. In this zone 7, the screw flights 12 are interrupted in a known way in the plane of the pins in order to avoid collision with the pins 11.

Arranged downstream of the pin-lined barrel zone 7 is a Transfermix zone 8, in which, in this illustrative embodiment, the angles between the flights 12 of the extruder screw 6 and the flights 13 of the extruder barrel 2 are greater than or equal to 105° and, with respect to one another, do not form angles complementary to 90°. As can be seen in the drawing, the channel depth of the extruder screw decreases to zero and then increases again in the longitudinal direction of the extruder. To the same degree, the channel depth of the barrel grooves increases and then decreases, so that the extruder is exchanged between the screw grooves and the barrel grooves to provide a good mixing effect.

In the processing section 10 of the extruder screw 6, the screw geometry is chosen such that the static melt pressure can be raised to the necessary mold pressure in a known way.

Provided downstream of the extruder screw 6, ahead of the outlet opening 4, is an apparatus for producing the desired static extrudate pressure in the extruder barrel. In the simplest embodiment, this apparatus comprises a disk 15 which has at least one passage opening 17 for the extrudate. The disk 15 protrudes into the processing space 14 of the extruder 1 in such a way that the passage cross section of the extruder barrel 2 can be reduced, and consequently the extrudate pressure can be increased.

As the drawing clearly shows, the disk 15 is mounted rotatably about an axis of rotation 20 and can be adjusted with the aid of a motor 16 and a pinion 18, acting on the outer toothing of the side 15, in such a way that passage openings 17 of different diameters or widths can be selectivley presented. In this way, the desired passage cross section can be set simply and quickly for different extrudates or extrusion conditions.

The extrusion tests carried out with such an extruder have shown that the output rate can be increased, in particular in the case of processing rubber, by up to a further 20%, which is to be explained in particular by the fact that the pin-lined barrel zone in combination with the Transfermix zone evidently requires a comparatively high static extrudate pressure for optimal operation.

Apart form this illustrative embodiment, there are other possible ways of achieving high-speed extrusion. For example, the Transfermix zone 8 could also be arranged upstream of the pin-lined barrel zone 7, although the sequence shown in the drawing yields better mixing and homogenizing results. In addition, it should be mentioned here that the pin-lined barrel zone also fulfills its mixing and homogenizing function if it has more than the two rows of pins illustrated. As far as the ratio between costs and mixing quality is concerned, the pin-lined barrel zone is best equipped with one to five rows of pins.

The preferred length of the individual extruder zones with an extruder length of 10 screw diameters (D) is about 3 D for the feed zone, 1.5 to 2 D for the pin-lined barrel zone, 2 to 2.5 D for the Transfermix zone and about 3 D for the pressure build-up zone.

Independently of these specifications, however, additional processing zones can also be arranged, according to requirements, ahead of, after or between the pin-lined barrel zone and Transfermix zone, such as for example venting or kneading zones.

What is claimed is:

1. A process for optimal operation of a high-speed extruder for the processing and production of rubber and thermoplastic materials and in which a feed opening and discharge opening are provided, and a pin-lined barrel zone and a Transfermix zone are arranged one behind the other, comprising the steps of:
   filling the extruder with the extrudate;
   drawing in, plasticizing, mixing and/or homogenizing the extrudate in a feed zone and in the pin-lined barrel zone of the extruder;
   homogenizing the extrudate in the Transfermix zone of the extruder;
   building up the die pressure in a pressure increasing zone of the extruder downstream of said Transfermix zone and in advance of the discharge opening, and discharging the extrudate, and wherein the static extrudate pressure in the entire pin-lined barrel zone and Transfermix zone is between 150 and 300 bar.

2. An extruder for the processing and production of rubber and thermoplastic materials, comprising:
   an extruder barrel having a feed inlet opening and discharge opening for discharging extrudate;
   an extruder screw mounted in said barrel for rotation about its longitudinal axis, said screw having a core and being formed with helical flights defining screw channels therebetween, said screw terminating upstream of said discharge opening and defining with said barrel a processing space downstream of said screw and in the area between the screw core and the barrel;
   a pin-lined barrel zone in which at least one row of pins extends radially into said processing space, said screw flights being interrupted in the areas of said pins;
   a Transfermix zone adjacent said pin-lined barrel zone, said barrel in such zone being formed with flights and adjoining grooves which complement the configured screw flights and channels in such zone to provide a good mixing effect, and
   means downstream of said screw and in advance of said discharge opening for reducing the passage cross-section of the processing space between the screw and the outlet opening, thereby increasing static extrudate pressure in the pin-lined barrel zone and Transfermix zone to between 150 and 300 bar.

3. The extruder as claimed in claim 2, wherein said pin-lined barrel zone is arranged upstream of said Transfermix zone.

4. The extruder as claimed in claim 2, wherein the extruder has upstream of the pin-lined barrel zone and Transfermix zone, a feed zone and has donwstream thereof a pressure increasing zone in which the passage cross-section reducing means is positioned, whereby extrudate can be extruded to the necessary die pressure.

5. The extruder as claimed in claim 4, wherein, with a preferable extruder length of 10 screw diameters (D), the feed zone is 3 D, the pin-lined barrel zone is 1.5 to 2 D, the Transfermix zone is 2 to 2.5 D and the pressure-increasing zone is about 3 D long.

6. The extruder as claimed in claim 2, wherein one to five rows of pins are arranged in the pin-lined barrel zone.

7. The extruder as claimed in claim 2, wherein the Transfermix zone of the extruder is designed in such a way that the angles between the flights of the extruder screw and the flights of the extruder barrel are greater than or equal to 105° and do not form angles complementary to 90°.

8. The extruder as claimed in claim 2, wherein said means for reducing the passage cross section comprises an externally toothed disk rotatable about its axis of rotation, said disk having at least one passage opening located in said processing space downstream of said extruder screw, and means for driving said disk about its axis of rotation.

9. The extruder as claimed in claim 8, wherein said means for driving said disc comprises a motor, and a pinion driven by said motor and engaging the toothed exterior of said disk.

10. The extruder as claimed in claim 2, wherein said disk is formed with a plurality of varying size passages, whereby a desired one of said passages can be rotated into position in said processing space to provide optimum results for a particular extrudate or extrusion condition.

* * * * *